United States Patent
Ge et al.

(10) Patent No.: US 8,386,605 B2
(45) Date of Patent: Feb. 26, 2013

(54) ACCESSING OF SAMPLE PORTIONS OF A LARGE DIGITAL FILE PRELIMINARY TO THE ACCESS OF THE ENTIRE FILE

(75) Inventors: Li Ge, Austin, TX (US); Hui Jiang, Austin, TX (US); Yu Tang, Round Rock, TX (US); Ping Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1808 days.

(21) Appl. No.: 11/427,088

(22) Filed: Jun. 28, 2006

(65) Prior Publication Data

US 2008/0005279 A1    Jan. 3, 2008

(51) Int. Cl.
*G06F 15/173* (2006.01)
(52) U.S. Cl. ........................... 709/225; 709/219
(58) Field of Classification Search .................. 709/219
See application file for complete search history.

(56) References Cited

U.S. PATENT DOCUMENTS

| | | | |
|---|---|---|---|
| 5,530,754 A * | 6/1996 | Garfinkle | 725/8 |
| 6,202,056 B1 * | 3/2001 | Nuttall | 705/52 |
| 7,209,900 B2 * | 4/2007 | Hunter et al. | 705/58 |
| 2004/0031856 A1 * | 2/2004 | Atsmon et al. | 235/492 |
| 2004/0064374 A1 * | 4/2004 | Cho | 705/26 |
| 2005/0102184 A1 * | 5/2005 | Koyata | 705/16 |
| 2006/0287956 A1 * | 12/2006 | Higashi et al. | 705/51 |
| 2007/0010195 A1 * | 1/2007 | Brown et al. | 455/3.06 |
| 2007/0245376 A1 * | 10/2007 | Svendsen | 725/46 |
| 2008/0016533 A1 * | 1/2008 | Rothschild | 725/60 |

* cited by examiner

*Primary Examiner* — Firmin Backer
*Assistant Examiner* — Jonathan Bui
(74) *Attorney, Agent, or Firm* — J. B. Kraft; D. A. Mims

(57) ABSTRACT

Accessing a digital file from a database which includes the steps of determining a first set of data entry protocols for enabling a user to access i.e. preview at least one portion of the digital file, enabling a user to access the one or more portions by entering the first set of protocols, determining a second set of data entry protocols for enabling a user to access the entire digital file from the database, and enabling a user to access the entire digital file by entering the second set of data entry protocols in response to the user accessing the one portion or some threshold of a predetermined number of such portions.

12 Claims, 5 Drawing Sheets

ACCESSING OF SAMPLE PORTIONS OF A LARGE DIGITAL FILE PRELIMINARY TO THE ACCESS OF THE ENTIRE FILE

CROSS-REFERENCE TO RELATED PATENT APPLICATION

The following copending patent application, which is assigned to the same assignee as the present invention, covers subject matter related to the subject matter of the present patent application: Application (application Ser. No. 11/427, 098) filed on the same date as the present Application, entitled An Implementation Enabling the Access of Sample Portions of an Initial Digital File Preliminary to the Access of Another File, Li Ge et al., hereby incorporated by reference.

TECHNICAL FIELD

The present invention relates to accessing of digital files from databases and particularly to databases at World Wide Web (Web) sites maintained on the Web, and more particularly to implementations enabling interactive users to effectively preview portions of such digital files.

BACKGROUND OF RELATED ART

The past generation has been marked by a technological revolution driven by the convergence of the data processing industry with the consumer electronics industry. The effect has, in turn, driven technologies that have been known and available but relatively quiescent over the years. A major one of these technologies is the Internet or Web. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of databases providing documents, media and computer programs through related distribution of Web documents, e.g. Web pages or electronic mail. Because of the ease with which documents are distributable via the Web, it has become a major source of data in all forms, e.g. documents, audio-visual presentations including movies, audio text and music, videos and computer programs.

Virtually all databases of such public information and data throughout the world are accessible and able to be searched via the Web. The ease with which great volumes of data may be searched from a computer attached to the Internet and equipped with a Web browser has led to the development of widespread electronic commerce over the Web. At the present time, it is becoming very rare to find a business organization of any kind that does not transact some aspect of the business via the Web.

The accessing of textual data from the Web is in the form of Web documents, e.g. Web pages available from Web sites that maintain databases of information from which such Web documents are formed. This is conventionally done via a Web browser installed at the receiving computer terminal or station that accesses the Web sites. The audio-visual content and computer programs are also accessible from databases maintained at such Web sites.

In the electronic commerce Web technology, the success of the global networks, such as the Web or Internet (used interchangeably herein), is very evident in the continually increasing volumes of transactions including consumer sales. However, in the areas of data distribution, including audio and video presentations, the opportunities for business profits has not kept pace with those in electronic commerce.

Through these global networks the user has access to vast repositories of data. In order for these database repositories and access to these databases to be continued to be maintained, more incentives need to be found for the providers and hosts of such databases. The demand for user access, as well as the amount of data that must be maintained in a database, has increased to such a great extent that goodwill and even advertising revenue are becoming insufficient compensation for the database maintainers and providers. Thus, the industry is facing the fact that increasingly the user accessing the data will have to be charged an equitable fee for the data.

SUMMARY OF THE PRESENT INVENTION

The present invention, in one aspect, provides an equitable implementation for providing compensation for the providers of files from maintained database by charging the requesting user a fee for such files. However, since, the user usually can not pay for a file without previewing it the invention provides for a modest or nominal previewing fee which can be absorbed into the eventual purchase fee for the digital data file being previewed.

It is noted that the audio music field, e.g. MP3 files, has already painfully recognized that audio music cannot be provided for free and that field now has many database providers who permit access to MP3 music at a fee. In addition, in this field a large market of music listeners has been developed who are willing to pay fair and reasonable fees for the MP3 music downloaded from Web site databases. In the illustrative embodiment that subsequently follows, we will use the MP3 music field as the embodiment in which to illustrate the present invention that provides reasonable previews of portions of music files that are available for purchase. However, it should be understood that fees are not the only conditions that may be imposed upon users previewing portions of, and perhaps ultimately accessing, i.e. downloading the entire file from Web site databases. There may be various security and identification requirements, or database providers may require personal data from the user to be used for future solicitations of the user, etc.

Accordingly, the present invention provides a system, method and computer program for accessing a digital files from a database that includes the steps of determining a first set of data entry protocols for enabling a user to access, i.e. preview at least one portion of said digital file enabling a user to access the one or more portions by entering the first set of protocols, determining a second set of data entry protocols for enabling a user to access the entire digital file from said database and enabling a user to access said entire digital file by entering said second set of data entry protocols in response to said user accessing the one portion or some threshold of a predetermined number of such portions. For example, the user may be enabled to access a sequential plurality of the portions up to and including all of the portions that make up the entire digital file by entering a corresponding sequence of said first sets of protocols, and the user is enabled to access said entire digital file in response to said user accessing a predetermined number of said portions in said sequence.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
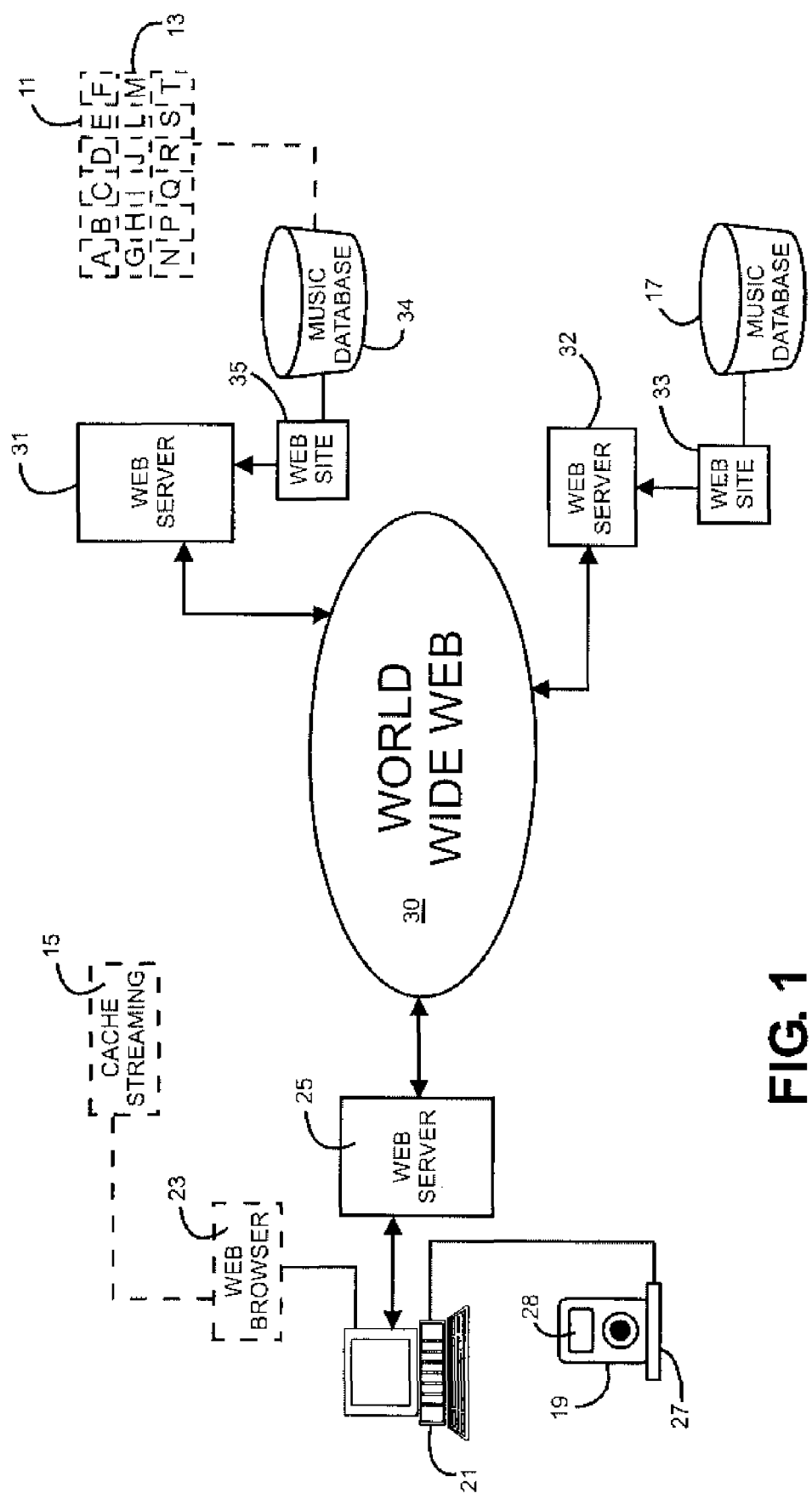
FIG. 1 is a generalized diagrammatic view of a network (Web) portion, i.e. an MP3 connected to desktop computer, connected to the Web via a server to illustrate how the present invention accesses preview portions of the large MP3 files before having an opportunity to acquire the whole MP3 digital file.

Referring to FIG. 1, a generalized example of the practice of the present invention involves a generalized portion of the Web that serves as the illustrative communication network in this embodiment of the present invention. An MP3 player 19 supported by desktop computer 21 is provided upon which the user will preview the portions of the entire digital file of audio music in deciding whether to download and store the entire music file. MP3 player 19, with display 28, e.g. an iPod™, is connected to dock 27 that in turn is connected to and synchronized with desktop computer 21 that in turn is connected to the Web 30 through its Web server 25 so that a user of computer controlled display terminal 21 may navigate on the Web 30 under the control of the Web browser program 23 in the desktop 21. The docking connection is a high-speed FireWire or USB 2.0 connection. The docking and connection to the desktop is described in greater detail at pp. 162-163 of the 2006 text, *iPod™+iTunes™ for Windows™ and Mac™ in a Snap*, Brian Tiemann, Sams Publishing, Indianapolis, Ind. The synchronization, and loading between the computer 21 and the MP3 player 19 is described in Chapter 6, pp. 161-198 of the text. When the accessing of the music file portions and the accessing of the entire music file are hereinafter described, it will be understood that desktop computer 21 under control of a conventional Web browser 23 obtains the portions of the entire music file from music file provider databases 34 or 17, at provider Web sites 35 and 33, respectively accessed through their Web servers 31 and 32. As will be hereinafter described in greater detail, during the listening to portions of the entire digital file, the portions will be streamed via the Web and temporarily stored in small packets in cache 15 associated with browser while the portion is being played. To illustrate, an entire music file 11 having accessible portions 13 is shown stored on database 34.

A typical computer that may be used in the practice of the invention for the desktop computer terminal or any of the servers shown in FIG. 1 will be described with respect to FIG. 2. A central processing unit (CPU) 10, such as one of the PC microprocessors or workstations available from International Business Machines Corporation (IBM) or Dell PC microprocessors, is provided and interconnected to various other components by system bus 12. An operating system 41 runs on CPU 10, provides control and is used to coordinate the function of the various components of the computer of FIG. 2. Operating system 41 may be one of the commercially available operating systems, such as IBM's AIX or Microsoft's WindowsXP™ or Windows 2000™, as well as UNIX and other IBM AIX operating systems. Application programs 40, controlled by the system, are moved into and out of the main memory Random Access Memory (RAM) 14. These programs include programs of the present invention and the Web browser for accessing the portions of the entire file, as well as the subsequent accessing of the entire file. These functions, which will be described hereinafter, will access the Web controlled by conventional Web browsers (browsers 23, FIG. 1) at Web display terminals 21 (FIG. 1), such as Microsoft's Internet Explorer™.

A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage drive 20. Communications adapter 44 interconnects bus 12 with an outside network, e.g. the Web. Bus 12 is also connected to the MP3 player dock (27, FIG. 1). I/O devices are also connected to system bus 12 via user interface adapter 22 and display adapter 36. Keyboard 24 and mouse 26 are all interconnected to bus 12 through user interface adapter 22. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 3:
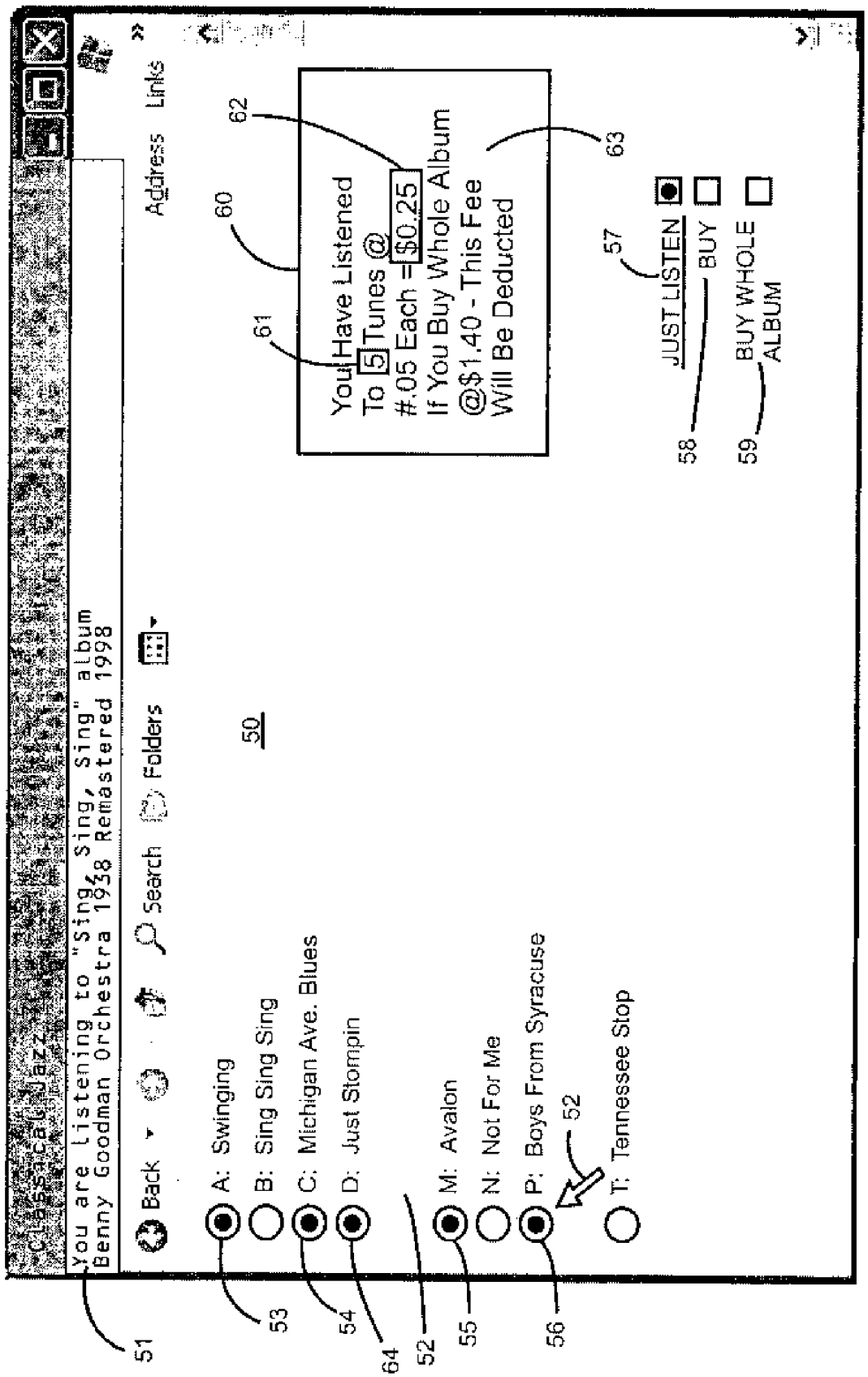
FIG. 3 is an illustrative desktop computer display screen showing the interactive interface of the present invention that permits the interactive user to access preview portions of and eventually entire digital files.

In FIG. 3, there is illustrated a simplified composite display screen 50 that may be used at the interactive user interface on the desktop terminal 21 of FIG. 1. The user is interested in perhaps buying the album 51, the entire digital file, but wishes to sample or preview portions. The user has selected the Just Listen 57 button and has already listened to selections of portions 53, 54, 55, 56 and 64 of the full digital (album) file (from portions 11 of file 13, FIG. 1). These have been selected through cursor 52. The user could have bought any of these portions individually by selecting the buy button 58. This would have resulted in the conventional downloading and storage of the individual purchased file. In any event, in accordance with the present invention, the user has just chosen to listen to the five tunes thus far and has not, as yet, decided on the purchase of the entire file (album). Accordingly, in dialog window 60 that keeps track of the portions listened to, the user is advised that he has listened to 5 portions, 61 at a user agreed price of $0.05 each for a total of $0.25, 62. The user is also prompted, 63, that should he decide to buy the entire music file (album), that the listening charge would be deducted from the $1.40 charge for the entire file. When the user selects to buy, the whole file would be accessed from the music database 34 Web site in FIG. 1 and downloaded to the user's computer terminal 21, FIG. 1. It should be noted that the user is enabled to set a threshold of a predetermined number of portions that must be listened to before the user will have the opportunity to buy the whole file 59.

Figure 4:
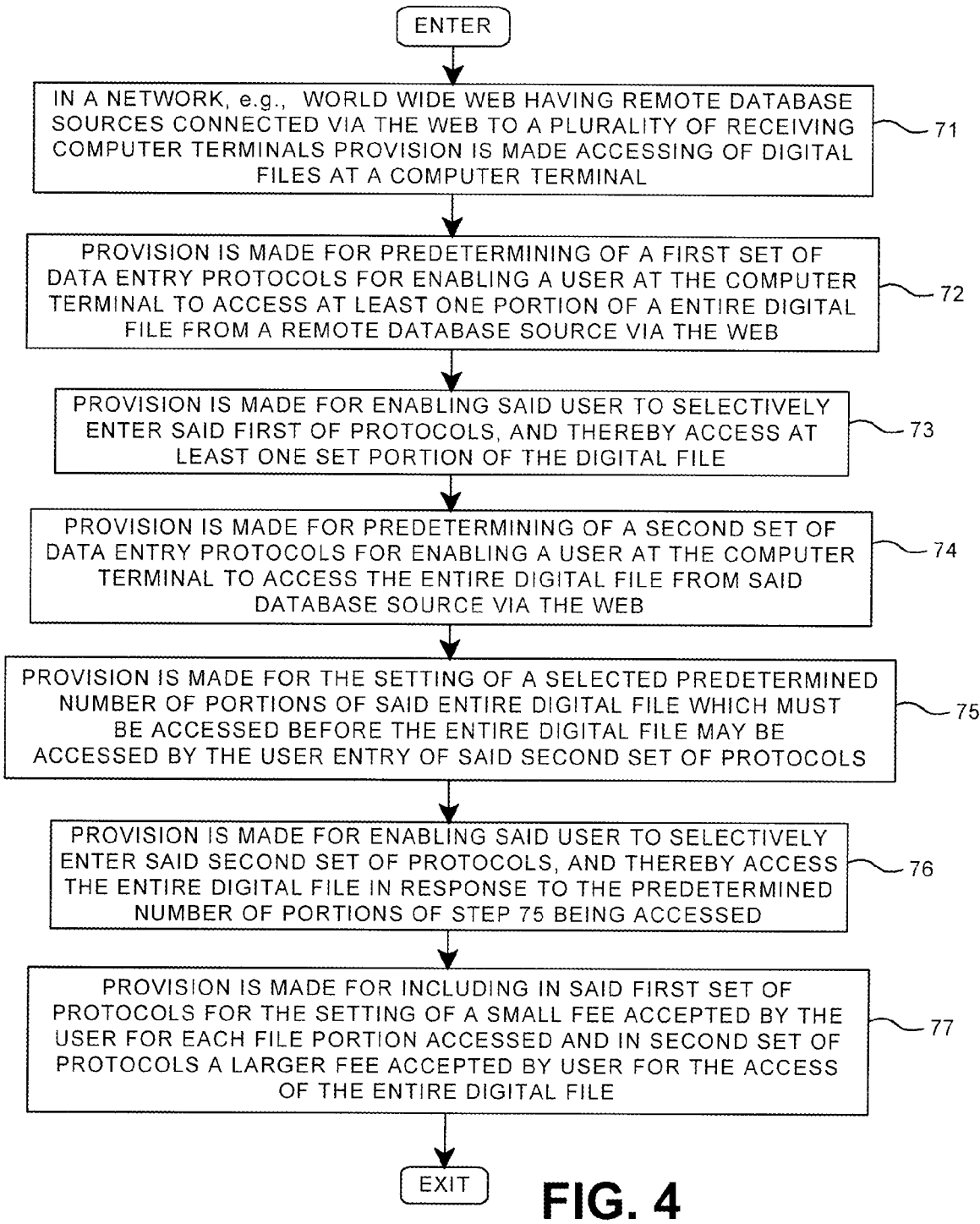
FIG. 4 is an illustrative flowchart describing the setting up of the programming functions to form the implementation of enabling a user to selectively access preview portions and then entire digital files in accordance with the present invention.

Now, with reference to the programming shown in FIG. 4, there will be described how the system and programs of the present invention are set up. For purposes of the present illustrative embodiment, we will present an implementation in which the entire digital file is an audio music file such as an album and the portions are tunes or individual songs in the entire album. It will be understood that the principles of the invention, as illustrated, will be applicable to other digital files accessed from remote sites on a network, such as large text files, files comprising computer programs, films, games or video presentations.

The digital files involved are accessible via the Web from remote databases to receiving user computer terminals, step 71. Provision is made for predetermining a first set of protocols that the user at the receiving terminal must accept by appropriate data entry in order to access one or more portions of the entire digital file from the database via the Web, step 72. These protocols may involve the acceptance of charges or fees, the acceptance of specified security requirements, authentication of identifiers for the terminal or the user, or acceptance of specified use restrictions. Provision is made for enabling the user to enter, i.e. accept, the first set of protocols and thereby access one or more portions of the entire digital file, step 73. Provision is made for predetermining a second set of protocols that the user at the receiving terminal must accept by appropriate data entry in order to access the entire digital file from the database via the Web, step 74. These protocols could include an acceptance of the condition that sets a specified predetermined number of portions of the digital file that must be accessed before the user is given the option of accessing the entire digital file through the entry of the second set of protocols, step 75. Provision is then made for enabling the user to enter the second set of protocols and thereby access the entire digital file, step 76. Finally, provision is made for the first set of data entry protocols to include provision for the setting of a small fee accepted by the user for each accessed file portion and for the provision in the second set of protocols for a larger fee accepted by user for the access of the entire digital file, step 77.

Figure 5:
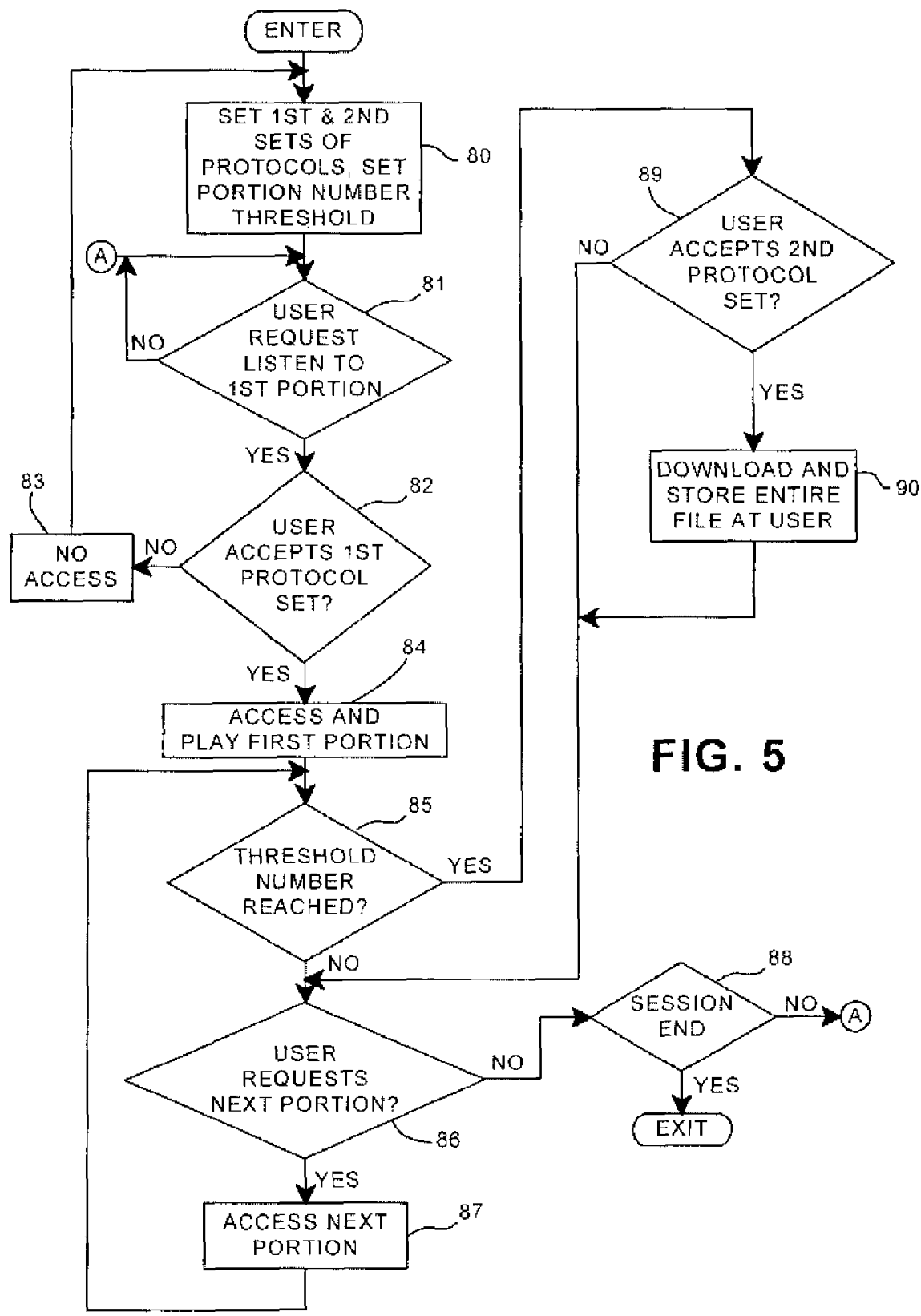
FIG. 5 is a flowchart of an illustrative run of the program set up according to FIG. 4.

With reference to the flowchart of FIG. 5, a simplified illustrative run of the process set up in FIG. 4 will be described. The first and second sets of predetermined protocols, as well as the threshold number of portions that must be accessed before the whole digital file may be accessed, are set up in the system, step 80. Next, a determination is made as to whether the user has requested an initial portion of the entire digital file, step 81. If Yes, then a further determination is made as to whether the user has accepted the first set of protocols, step 82. If No, the user is denied access, step 83, and the process is returned to step 80. If the determination from step 82 is Yes, the user is enabled to access and play a first portion of the entire digital file, step 84. It should be noted that in this listening state the data for playing of the tune or song of the first portion is just in the form of a Web radio stream, i.e. it is moved in short duration data packets in and out of the cache 15, FIG. 1. The stream is transitory. It cannot be downloaded for storage. A determination is made as to whether the threshold number of portions that must be accessed before the entire digital file may be ordered has been reached, step 86. If Yes, a further determination is made as whether the user accepts the second set of protocols. If Yes, then the entire digital file is downloaded and stored on the user's computer terminal, step 90. Then, or if the determination in either step 89 or step 85 is No, a further determination is made, step 86, as to whether the user has requested a next portion. If Yes, the next portion is accessed, listened to and the process is returned to step 85. If the determination in step 86 is No, then a determination may be made, step 88, as to whether the user has ended the session. If Yes, the session is exited. If No, the process is branched via "A" back to step 81.

Figure 2:
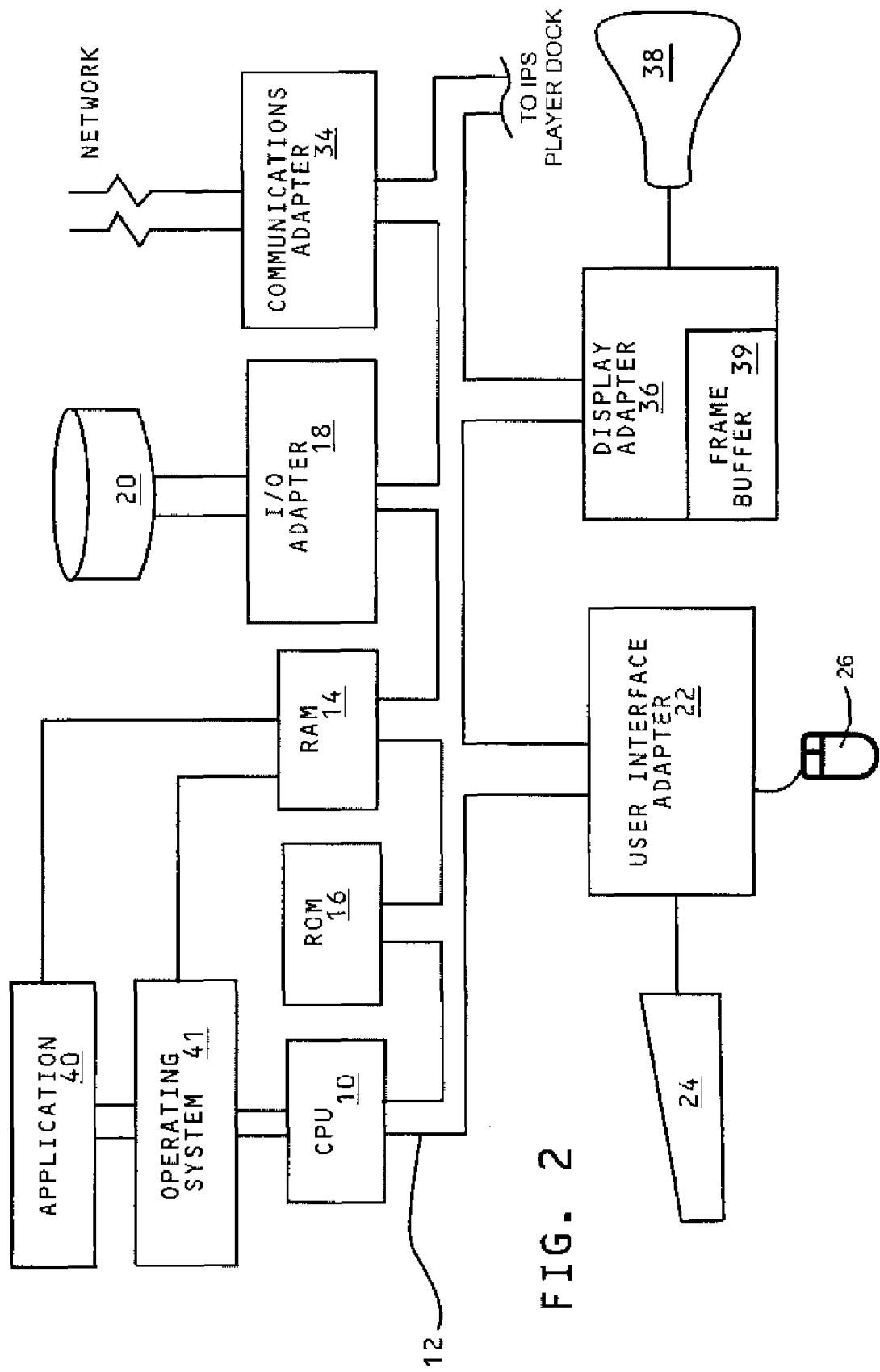
FIG. 2 is a block diagram of a data processing system including a central processing unit and network connections via a communications adapter that functions as the desktop computer display station through which preview portions, as well as entire digital files, may be accessed from provider sources via the Web.

One of the preferred implementations of the present invention is in application program 40, i.e. a program made up of programming steps or instructions for accessing portions of the entire file, as well as the accessing of the entire digital file, resident in RAM 14, FIG. 2, of a Web receiving station and/or Web server during various Web operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Web itself, when required by the user of the present invention.

One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer controlled interactive display method for accessing a plurality of discrete portions of an entire digital audio file from a database comprising:
   displaying a first dialog menu enabling a user to interactively select a plurality of displayed representations of said discrete portions to be accessed from said database for a first fee for each accessed portion;
   tracking the total number of portions to be accessed from the database;
   predetermining a total number of portions less than the number of portions in the entire digital file; and
   displaying a second displayed dialog, responsive to determining that said predetermined number of portions has been selected by the user, for offering the entire digital audio file to said user at fee greater than the total fee for said predetermined number of portions.

2. The method of claim 1 wherein said database is remote, and further including accessing said digital file from said remote database via a communications network.

3. The method of claim 2 wherein said network is the World Wide Web.

4. The method of claim 3 wherein said digital file is an audio file comprising a musical presentation content, and said portions are units of the musical presentation.

5. A computer controlled interactive display system for accessing a plurality of discrete portions of an entire digital audio file from a database comprising:
   a displayed first dialog menu enabling a user to interactively select a plurality of displayed representations of said discrete portions to be accessed from said database for a first fee for each accessed portion;
   means for tracking the total number of portions to be accessed from the database;
   means for predetermining a total number of portions less than the number of portions in the entire digitai file; and
   a second displayed dialog, responsive to said means for tracking the total number of portions determining that said predetermined number of portions has been selected by the user, for offering the entire digital audio file to said user at fee greater than the total fee for said predetermined number of portions.

6. The computer controlled interactive display system of claim 5 wherein said database is remote, and further including means for accessing said digital file from said remote database via a communications network.

7. The computer controlled interactive display system of claim 6 wherein said network is the World Wide Web.

8. The computer controlled interactive display system of claim 7 wherein said digital file is an audio file comprising a musical presentation content, and said portions are units of the musical presentation.

9. A computer usable medium having stored thereon a computer readable program for accessing a plurality of discrete portions of an entire digital audio file from a database, wherein the computer readable application program when executed on a computer causes the computer to:

display a first dialog menu enabling a user to interactively select a plurality of displayed representations of said discrete portions to be accessed from said database for a first fee for each accessed portion;

track the total number of portions to be accessed from the database;

predetermine a total number of portions less than the number of portions in the entire digital file; and display a second displayed dialog, responsive to determining that said predetermined number of portions has been selected by the user, for offering the entire digital audio file to said user at fee greater than the total fee for said predetermined number of portions.

10. The computer usable medium of claim 9 wherein said database is remote, and said computer program when executed further causes the computer to access said digital file from said remote database via a communications network.

11. The computer usable medium of claim 10 wherein said network is the World Wide Web.

12. The computer usable medium of claim 11 wherein said digital file is an audio file comprising a musical presentation content, and said portions are units of the musical presentation.

* * * * *